United States Patent [19]

Smith

[11] Patent Number: 5,379,903
[45] Date of Patent: Jan. 10, 1995

[54] ELECTRIC HAIR CLIPPER UTILITY BOARD

[76] Inventor: William L. Smith, 21757 Lake Vista Dr., Lake Forest, Calif. 92630

[21] Appl. No.: 185,403

[22] Filed: Jan. 24, 1994

[51] Int. Cl.$^6$ ............................................... A47F 7/00
[52] U.S. Cl. ...................................... 211/13; 211/26; 242/378.4; 132/289
[58] Field of Search ............... 242/378.4; 211/13, 26, 211/70.6, 87; 248/51, 52, 690, 692, 906; 206/825; 312/223.1, 223.6; 30/90; 132/289

[56] References Cited

U.S. PATENT DOCUMENTS

| | | | |
|---|---|---|---|
| 3,034,516 | 5/1962 | Brown | 132/80 |
| 3,489,476 | 1/1970 | Weickgenannt et al. | 312/209 |
| 3,826,879 | 7/1974 | Penn et al. | 191/12.4 |
| 4,159,773 | 7/1979 | Losenno | 211/70.6 |
| 4,232,837 | 11/1980 | Cutler et al. | 242/107 |
| 5,074,863 | 12/1991 | Dines | 606/41 |

Primary Examiner—Leslie A. Braun
Assistant Examiner—Catherine S. Collins
Attorney, Agent, or Firm—Gary Appel

[57] ABSTRACT

An apparatus for holding a plurality of barber electric hair clippers in a ready-to-use position when they are not being used comprises a plate having a plurality of hooks for enabling the hanging of the hair clippers, and a like number of electrical cords extending outwardly through corresponding apertures formed through the plate, each of the apertures being relatively adjacent to a corresponding one of the hooks, the outwardly extending end of each of the electrical cords being configured for electrical connection to a conventional electric hair clipper for the operation thereof. Automatic cord retractors are connected to each of the electric cords rearwardly of the plate for enabling the extending of the cords from the plate when a hair clipper to which the cord is connected is unhooked from its hook on the plate for use and for automatically retracting the cord when the hair clipper is rehung on its hook. Each cord has a cord stop attached to it forwardly of the plate so as to limit the amount of electric cord that is automatically retracted through the plate when an electric hair clipper connected to the cord is hung up. The cord retractors are mounted in a box having the plate as a front cover. The electric cords are connected by a common cord which can be plugged into a preexisting power outlet. A shelf may be fixed to the plate beneath the hooks for holding barber implements such as comb and scissors. The apparatus may include one or more hair clippers already connected to the electrical cords.

16 Claims, 3 Drawing Sheets

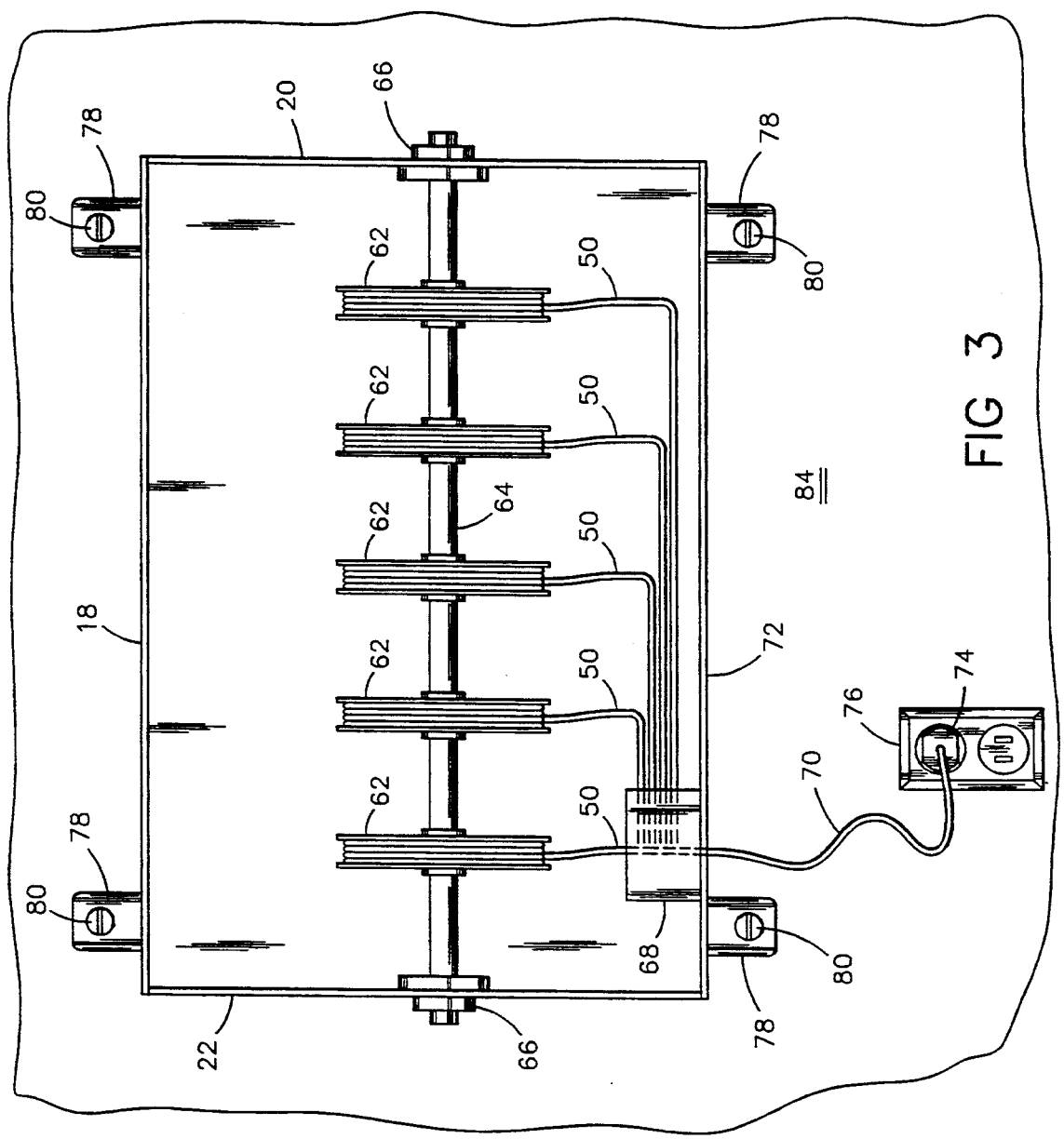

ELECTRIC HAIR CLIPPER UTILITY BOARD

BACKGROUND OF THE INVENTION

1. Field of the Invention

The present invention relates generally to the field of barbering implements, and more particularly to apparatus for holding and organizing electric hair clippers and other implements used in the barbering profession.

2. Background Discussion

Barbers customarily use two or more different types and/or sizes of electric hair clippers (including hair trimmers) each time they cut hair. Between uses, the hair clippers are usually laid down in a location where they are readily accessible or are hung up from a convenient hook, the hair clippers being typically constructed having a metal hanging loop at the handle end.

The comb-like cutting end or cutters of hair clippers of the types used by most barbers are made from a very hard metal. This hard metal results in a long cutting life for the cutters, but at the same time results in the tips of the cutters being quite brittle. Consequently, the cutters can be damaged and ruined relatively easily. For example, the cutting end of hair clippers may be accidentally struck against a porcelain sink used for hair washing when the hair clippers are laid down or, if the hair clipper is hung up, the exposed cord to the clippers may be accidentally pulled, thereby causing the clippers to be dislodged from its hook and fall on the floor. Although damaged or broken cutters can be replaced, they are relatively expensive and the use of damaged hair clipper cutters can result in uneven hair clipping and possible scalp injury to an individual on which the damaged hair clippers are used for giving a haircut.

For these and other reasons, the present inventor has invented an apparatus onto which barbers' electric hair clippers can be easily and securely hung and without exposed electrical cords.

SUMMARY OF THE INVENTION

In accordance with the present invention there is provided an apparatus for holding one or more barbers' electric hair clippers in a ready-to-use position when any of the hair clippers are not being used. The apparatus of the present invention comprises a plate having one or more hooks for enabling the hanging of a like number of barbers' hair clippers in a ready-to-use position.

A corresponding number of electrical cords extend outwardly through corresponding apertures formed through the plate relatively adjacent to the hooks, the outwardly extending end of each of the electrical cords being configured for being electrically connected to a conventional electric hair clipper for the operation thereof. There may be included in the apparatus one or more hair clippers already connected to the electrical cords so that a user does not have to provide his or her own hair clippers.

There are included in the apparatus automatic cord retracting means connected to each of the electric cords rearwardly of the plate for enabling the withdrawing of an electric cord when a hair clipper to which the cord is connected is unhooked from its hook on the plate for use and for automatically retracting the cord when the hair clipper is rehung on its hook. A cord stop is attached to each of the electrical cords forwardly of the plate so as to limit the amount of electric cord that is automatically retracted when an electric hair clipper connected to the cord is hung up on its hook. Means are further included for electrically connecting each of the electrical cords to a source of operating voltage, such as a preexisting wall outlet. In addition, there are included means enabling the apparatus to be attached to a vertical surface, such as a wall or cabinet.

In accordance with a preferred embodiment of the invention, there are included at least four hooks for hanging a like number of hair clippers and a tray attached to the plate beneath the hooks, the tray being configured for holding barbering implements, such as combs and scissors. It is, of course, preferred that the cord stops are larger than the apertures in the plate through which the cords pass. Preferably the plate forms a front side of box in which the retracting means are disposed and the electric cord retracting means includes a separate cord coiler for each of the electrical cords. Thus, hair clippers to which the individual electrical cords are connected can be hung from the hooks on the plate when the clippers are not in use and the hair clipper cords are automatically retracted into the box of which the plate forms the front.

When any one of the hair clippers is to be used, it is unhooked from the plate and its cord it pulled out of the associated retracting mechanism. When through with the hair clipper, the user rehangs it on its hook and the cord automatically retracts into the box.

BRIEF DESCRIPTION OF THE DRAWINGS

The present invention can be more readily understood by a consideration of the following detailed description when taken in conjunction with the accompanying drawings, in which:

FIG. 3 is a longitudinal cross sectional drawing taken along line 3—3 of FIG. 1, showing, by way of example, five hair clipper cord retractors mounted in an axially-spaced apart relationship on a common shaft mounted within the utility box and showing individual electrical cords from each of the cord retractors connected to a common external cord that plugs into a preexisting electrical wall outlet.

In the various FIGS. identical elements and features are given the same reference number.

DETAILED DESCRIPTION OF THE INVENTION

Figure 1:
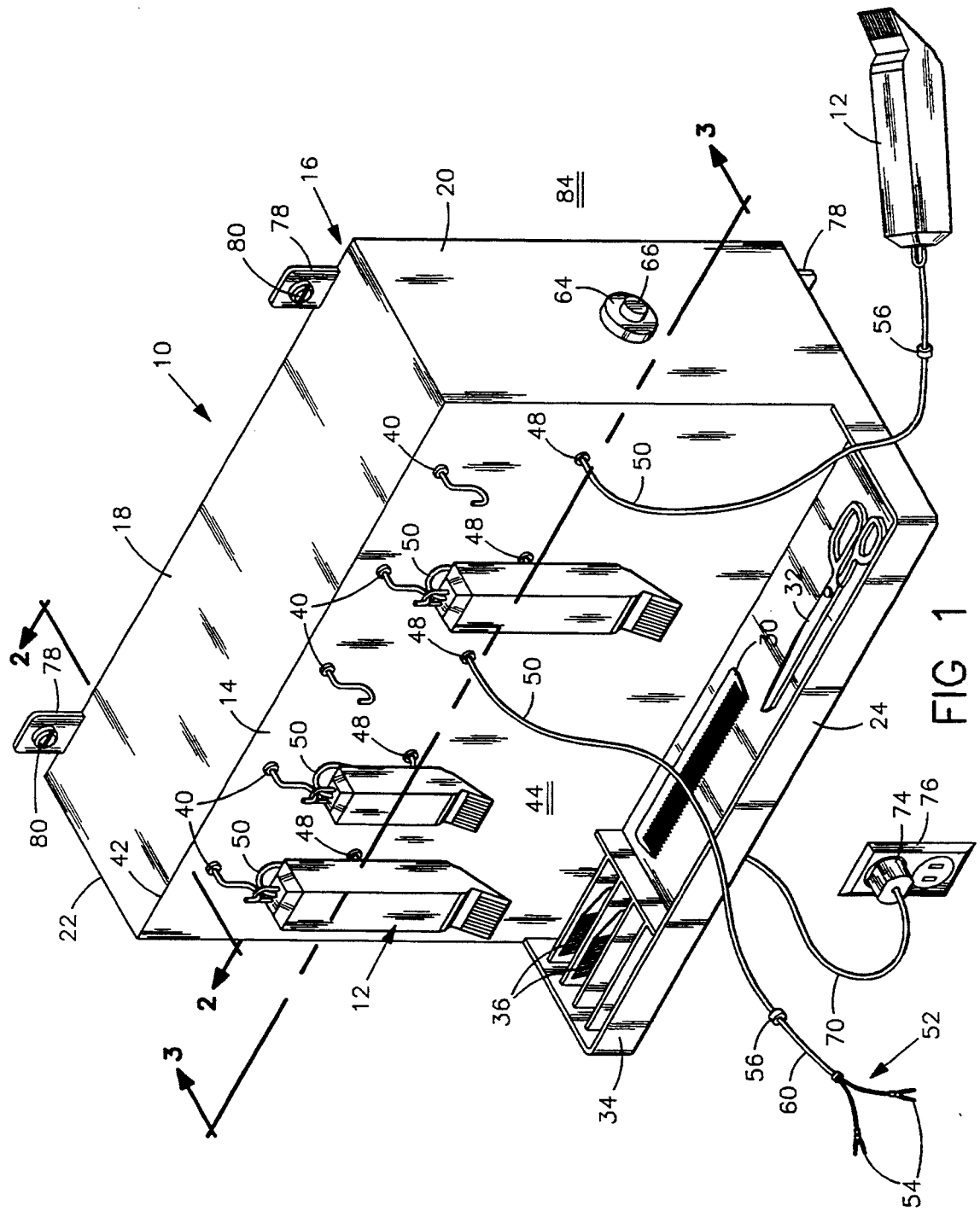
FIG. 1 is a perspective drawing of the barbering hair clipper utility board or box in accordance with the present invention, showing the manner in which a plurality of electric hair clippers are hung from a face of the box when not being used and with the clipper cords retracted into the box and showing a projecting tray portion of the box which can be used to hold barbering implements, such as combs and scissors.

There is shown in FIG. 1 an apparatus 10 for holding one or more barbers' hair clippers 12. As more particularly described below, apparatus 10 comprises a rigid hair clipper holding board or plate 14 which forms the front face of a box 16. Further comprising box 16 is a top 18 and right and left sides 20 and 22 respectively. A shallow tray 24 projects forwardly from lower regions of plate 14 and is configured for holding such barbering implements as a comb 30 and hair scissors 32. A small region 34 of tray 24 may be used for holding different and/or spare cutters 36 used on hair clippers 12.

Figure 2:
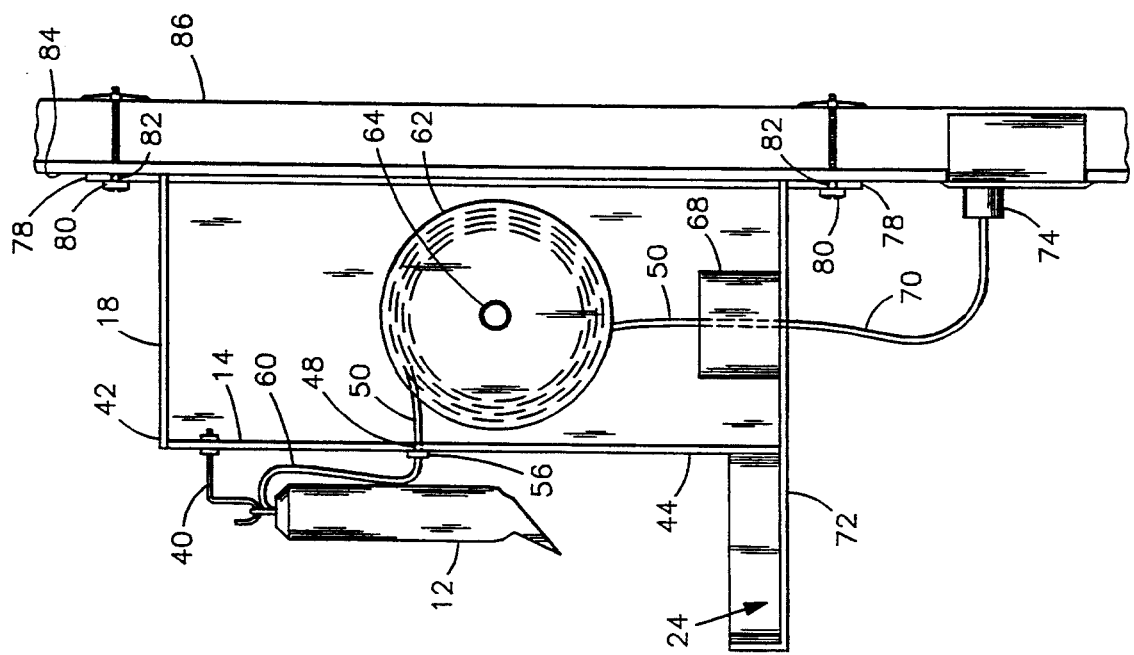
FIG. 2 is a transverse cross sectional drawing taken along line 2—2 of FIG. 1, showing the manner in which a representative electric hair clipper is hung from a hook on the utility box and showing an automatic cord retractor in which the clipper cord is retracted inside the box when the hair clipper is not in use and showing an external electrical cord from the box plugged into a preexisting electrical wall outlet.

A plurality of hair clipper hooks 40 (FIGS. 1 and 2) are attached to plate 14 in a longitudinally spaced-apart relationship, relatively near an upper edge 42 of the plate. By way of example, and with no limitations being thereby intended or implied, five hooks 40 as shown in FIG. 1. Hooks 40 project outwardly about an inch or so from a front surface 44 of plate 14 so that hair cutter 12 hangs freely from plate 14 (FIG. 2). Hooks 40 are spaced sufficiently far apart so that when hair clippers 12 are hung from each hook any one can be easily grasped by a user without interfering with any of the others and without danger of knocking any of the other hair clippers off their hooks-as such, the hooks may be spaced about three or four inches apart.

Associated with each hook 40 and positioned therebelow, is an aperture 48 through each of which extends part of an electrical cord 50. As shown in FIG. 1 for a middle one of cords 50, an exposed, distal end 52 thereof is constructed having electrical connectors 54 which enable the connection of the cord to a conventional hair clipper 12.

Each electrical cord 50 has fixed thereto a stop 56 which limits the amount of the cord that can be retracted into box 16, each such stops being larger than the apertures 48 through which it passes. End regions 60 of electrical cords 50, between stops 56 and end connectors 54 are sufficiently long to permit a connected hair clipper 12 to hang freely from its hook 40 without excess cord being exposed (FIG. 2), thereby eliminating the possibility of cords 50 becoming entangled with one another.

Rearwardly of plate 14, each cord 50 is wound onto a cord retractor 62 of spring type (FIGS. 2 and 3), as is well known in the electrical arts. Each retractor 62 enable its associated electrical cord 50 to be pulled a limited amount, for example, about six to eight feet, through associated aperture 48 when the attached hair clipper 12 is being used. When the hair clipper is subsequently rehung on its hook 40, retractor 62 automatically reels in cord 50 until the cord stop 56 reaches plate face 44 at its aperture 48.

As shown in FIG. 3, cord retractors 62 are mounted in axial spaced-apart relationship on a common longitudinal shaft 64 that extends through sides 20 and 22 of box 16, the shaft being retained by end retainers 66. Each electrical cord 50 extends within box 16 from its retractor 62 to a common junction box 68. From junction box 68 a common electrical cord 70 extends through a bottom 72 of box 16 and is terminated in an electrical plug 74 that plugs into any conveniently located wall electrical outlet 76 (FIGS. 2 and 3).

Box 16 preferably includes mounting tabs 78 near or at each rear corner (FIGS. 1-3). Screws 80 extending through apertures 82 in tabs 78 (FIG. 2) are used to anchor apparatus 10 to a vertical surface 84, which may be a surface of a wall or cabinet 86.

Although there has been described and illustrated a utility board or box for holding a plurality of barbers' electric hair clippers in accordance with the present invention for purposes of illustrating the manner in which the invention may be used to advantage, it is to be appreciated that the invention is not limited thereto. Therefore, any and all variations and modifications that may occur to those skilled in the barbering art are to be considered as being within the scope and spirit of the claims as appended hereto.

What is claimed is:

1. An apparatus for holding one or more barber electric hair clippers in a ready to use position when any of said one or more hair clippers are not being used, said holding apparatus comprising:
   a. a plate having one or more hooks for enabling the hanging of a like number of barber hair clippers in a ready to use position;
   b. a corresponding number of electrical cords extending outwardly through corresponding apertures formed through said plate relatively adjacent to said one or more hooks, an outwardly extending, distal end of each of said electrical cords being configured for being electrically connected to a conventional electric hair clipper for the operation thereof;
   c. automatic cord retracting means connected to each of said one or more electric cords rearwardly of said plate for enabling the withdrawing of an electric cord when a hair clipper to which the cord is connected is unhooked from one of said hooks on said plate for use and for automatically retracting said cord when said hair clipper is rehung on said hook;
   d. a cord stop attached to each one of said one or more electrical cords forwardly of said plate so as to limit the amount of electric cord that is automatically retracted when an electric hair clipper connected to the cord is hung up on one of said one or more hooks; and
   e. means for electrically connecting each of said one or more electrical cords to a source of operating voltage.

2. The hair clipper holding apparatus as claimed in claim 1, including means enabling said apparatus to be attached to a vertical surface.

3. The hair clipper holding apparatus as claimed in claim 1, wherein there are included at least four hooks for hanging a like number of hair clippers.

4. The hair clipper holding apparatus as claimed in claim 1, wherein the apparatus further comprises a tray attached to said plate beneath said hooks, said tray configured for holding barbering implements.

5. The hair clipper holding apparatus as claimed in claim 1, wherein each of said cord stops is larger than the aperture in said plate through which the associated cord passes.

6. The hair clipper holding apparatus as claimed in claim 1, including one or more hair clippers connected to said distal ends of said electrical cords.

7. An apparatus holding a plurality of barber electric hair clippers in a ready to use position when any of said hair clippers are not being used, said holding apparatus comprising:
   a. a plate having a plurality of hooks for enabling the hanging of a like number of barber hair clippers in a ready to use position;
   b. a like number of electrical cords extending outwardly through corresponding apertures formed through said plate, each of said apertures being relatively adjacent to a corresponding one of said hooks, the outwardly extending end of each of said electrical cords being configured for being electrically connected to a conventional electric hair clipper for the operation thereof;

c. automatic cord retracting means connected to each of said electric cords rearwardly of said plate for enabling the extending of any of said cords from the plate a hair clipper to which the cord is connected is unhooked from one of said hooks on said plate for use and for automatically retracting said cord when said hair clipper is rehung on said hook;

d. a plurality of cord stops, each said cord stop being fixed to an associated one of the electrical cords forwardly of said plate so as to limit the amount of electric cord that is automatically retracted through the plate when an electric hair clipper connected to the cord is hung up on one of said hooks; and e. means for electrically connecting said plurality of electrical cords to a preexisting power outlet.

8. The hair clipper holding apparatus as claimed in claim 7, including means enabling said apparatus to be attached to a vertical surface.

9. The hair clipper holding apparatus as claimed in claim 7, wherein the apparatus further comprises a tray attached to said plate beneath said hooks, said tray configured for holding barbering implements.

10. The hair clipper holding apparatus as claimed in claim 7, wherein each of said cord stops is larger than the aperture in said plate through which the associated cord passes.

11. The hair clipper holding apparatus as claimed in claim 70 wherein said plate forms a front side of a box in which are mounted said retracting means.

12. The hair clipper holding apparatus as claimed in claim 7, said electric cord retracting means includes a separate cord coiler for each of said plurality of electrical cords.

13. An apparatus for holding at least one electric hair clipper in a ready to use position when said at least one of said hair clippers is not being used, said holding apparatus comprising:

a. a plate having at least one hook for enabling the hanging of said at least one hair clippers in a ready to use position;

b. at least one electrical cord extending outwardly through a corresponding aperture formed through said plate, said at least one electrical cord having a distal end region configured for electrical connection to an electric hair clipper;

c. at least one electric hair clipper, said hair clipper being electrically connected to the distal end of said at least one electric cord;

d. automatic cord retracting means connected to each of said at least one electrical cord rearwardly of said plate for enabling the extending of said a least one cord from the plate when said at least one hair clipper is unhooked from said at least one hook on said plate for use and for automatically retracting said cord when said hair clipper is rehung on said hook;

e. a cord stop fixed to said at least one electrical cord forwardly of said plate so as to limit the amount of electric cord that is automatically retracted through the plate when said at least one electric hair clipper connected to the cord is hung up on said at least one hook; and f. means for electrically connecting said at least one electrical cord to a preexisting power outlet.

14. The hair clipper holding apparatus as claimed in claim 13, including means enabling said apparatus to be attached to a vertical surface.

15. The hair clipper holding apparatus as claimed in claim 13, wherein the apparatus further comprises a tray attached to said plate beneath said at least one hook, said tray being configured for holding barbering implements.

16. The hair clipper holding apparatus as claimed in claim 13, wherein said plate forms a front side of a box in which are mounted said retracting means.

* * * * *